May 23, 1961 G. S. BUCCINO 2,985,293
SUTURE PACKAGE WITH DIMPLED EDGE
Filed April 3, 1958
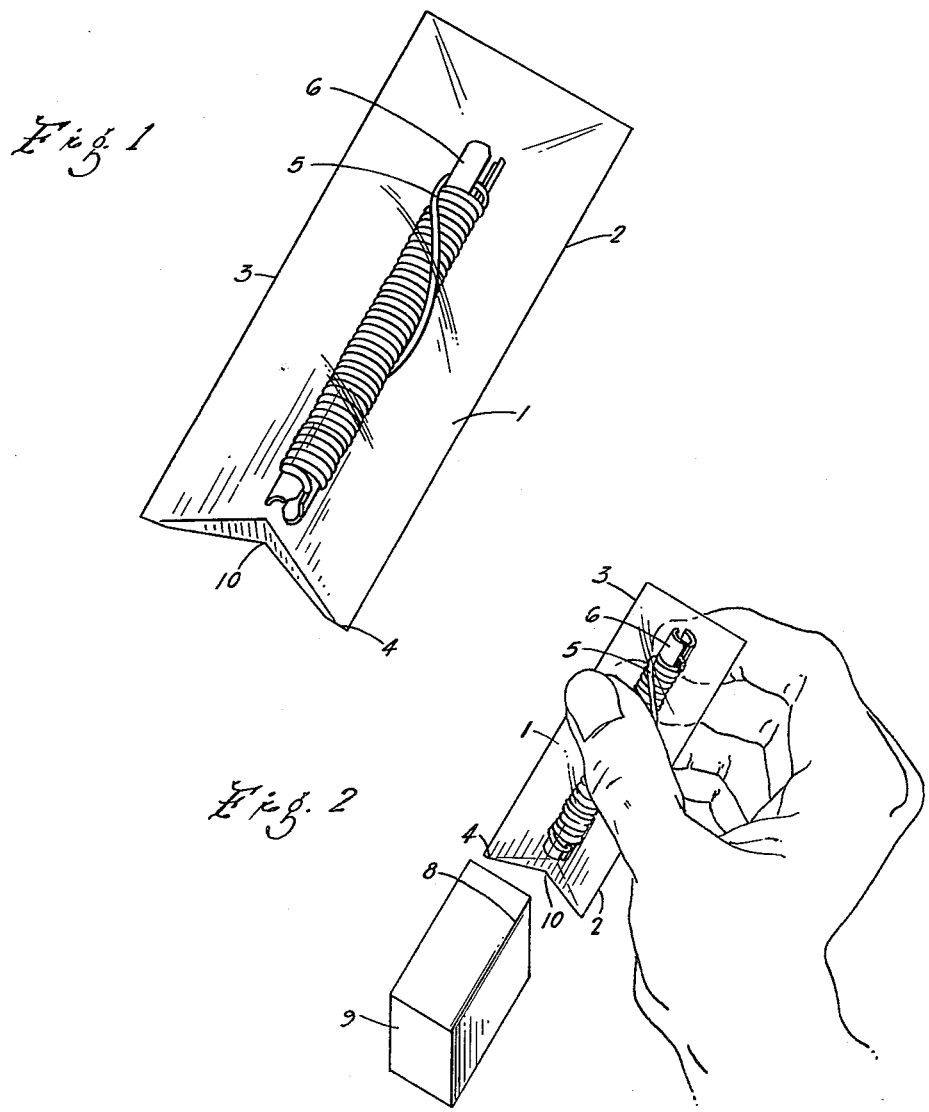
INVENTOR.
GAETANO SALVATORE BUCCINO,
BY
ATTORNEY.

2,985,293
SUTURE PACKAGE WITH DIMPLED EDGE

Gaetano Salvatore Buccino, Danbury, Conn., assignor to American Cyanamid Company, New York, N.Y., a corporation of Maine Filed Apr. 3, 1958, Ser. No. 726,281

1 Claim. (Cl. 206—63.3)

This invention relates to a method of producing an improved type of suture package and to the package thus produced.

A substantially flat container of a semi-rigid, nonextrudable thermoplastic resin film having a heat-sealed edge and a folded edge containing a suture is desirable.

It is conventional in the packaging art to use flexible-walled containers formed from flat sheet stock with generally straight, heat-sealed side edges and a folded bottom edge. Such containers have the advantage of relatively low cost of manufacture. However, such containers usually have the disadvantage that when they are filled with a surgical suture with or without tubing fluid, particularly a reeled suture, the bulging due to the suture and internal pressure within the container produces high stress areas in the material of which the container is made adjacent to the sealed edge. In other words, due to the shape of the suture and the weight of the suture and tubing fluid, the side walls of the package have a tendency to bulge out, oftentimes resulting in a rupture of a seam of the container. Moreover, when the container is one fabricated from a less flexible packaging material the problem of rupture becomes more pronounced since the deformation occurring in the areas of high stress is not able to be reduced to any considerable extent because of the less elastic quality of the material. When a package fabricated from such a less flexible or semirigid packaging material has been subjected to some type of heat treatment after it has been formed and filled, e.g., heat sterilization, a seam or seal of the container has the tendency to become brittle. Brittleness of the seal or seam may also occur when the packaging material has been aged. Because of this brittleness, the high stress which has been developed in the container material more easily causes a rupturing or breaking of the seal or the seam of the container.

One method of preventing the rupture of the seams of a flexible-walled package has been to enlarge the sealed area at or near or along that part of the container whose walls are subjected to high stress because of the presence of a fluent type commodity therein. While this particular method is deemed to be advantageous, it would appear that the method is not adaptable to certain types of packaging materials, which because of their physical properties such as elasticity, softening temperature, or the like, are not especially adaptable to being formed into a container with an enlargement of the sealed area. As one example of a packaging material which is not suitable to be made into a container with an enlarged sealed area, mention may be made of a thermoplastic resin film such as that formed from the polyethylene glycol ester of terephthalic acid known and sold in the trade as "Mylar" film. In contrast to the many and various other types of thermoplastic flexible packaging materials, e.g., Pliofilm, polyethylene and the like, which may be formed into tubes, the polymeric polyhydric alcohol terephthalic ester is not especially adaptable for this purpose since a film formed therefrom is generally too rigid to follow thick contours without undue deformation.

Thus, it is necessary to develop a method of forming a package from semirigid thermoplastic packaging materials of which "Mylar" film is one example. Because of its low cost and also because of its being able to withstand heat sterilization, it is especially adaptable for surgical packaging. A method of adapting such films to suture packaging is desirable.

According to the present invention, it has been found that by impressing a dihedral indent (which may for simplicity be hereinafter at times referred to as "dimpling") on a folded edge of a container formed from such a semirigid, nonextrudable thermoplastic, undue deformation resulting from areas of high stress in the edges of the container is avoided. In using such a semirigid thermoplastic resin film, which is essentially planar in character, for an envelope or container, some bulging of the material occurs when a suture is inserted therein. In order, therefore, to permit essentially straight seals on the heat sealed edges, either the edges of the package must be bent or some other form of deformation must be utilized. When the bottom is dimpled, the two sides and the top of the envelope are stressed much less since even theoretically these may consist of substantially plane surfaces which are distorted only at the dimpled edge and that edge alone must be subject to complex bending. This edge is flexible whereas the heat sealed edges are comparatively inflexible. Thus, the purpose of the present invention is to throw bending stresses into the more flexible dimpled edge rather than the heat-sealed edges. Rupturing or breaking of the seals or seams is thus obviated.

The impressing of a dihedral indent on a folded edge may be accomplished by manual or mechanical means.

For purposes of illustration only and not of limitation of the scope of this invention, the appended drawing shows a container of substantially flat form in which a dihedral indent has been impressed, and one means for dimpling such a container. A further understanding of the method of the present invention will become apparent upon consideration of the following detailed description, reference being had to the drawing accompanying and forming a part of the specification in which:

Figure 1 is a perspective view of a package within the purview of the invention.

Figure 2 is a perspective showing one method of dimpling the folded edge of the package of Figure 1.

Referring to the above figures: "Mylar" film of 3 mil gauge (0.003 inch) is formed into a flat envelope 1 by folding or doubling a strip of film and heat-sealing the folded film along lines 2 and 3 which are parallel to one another and which are perpendicular to the axis of the fold 4 at selected and predetermined distances from one another so as to produce an envelope, approximately one inch wide and three inches long. A surgical suture 5 wound on a cylindrical reel 6 is inserted in the envelope which is sterilized and then sterilely filled with tubing fluid. The top of the envelope is then heat-sealed. For sutures which are to be dry stored, the filling with tubing fluid is omitted. A suitable identifying label may be enclosed.

The final step in the process, which constitutes the principal feature of this invention, is the dimpling operation which is performed by pressing the folded edge 4 of the filled, generally rectangular package against an edge 8 of an object such as a wooden block 9, to form a dimple or dihedral indent 10.

It is thus seen that the flexible dimpled edge is then one of diamond shaped configuration, the bottom of the envelope having been spread, each side of the envelope having been changed from a warped surface to two intersecting planes, which now have a very gradual line of intersection. The bottom fold is shaped to two intersecting planes, and substantially all bending stresses are concentrated in the thus bent folded edge, which is the edge most able to stand them.

While the invention contemplates the use of the polymeric ethylene glycol ester of terephthalic acid as the packaging material or film, other semirigid, films may be used.

Further, while a substantially rectangular shaped container has been shown and described herein, it is also within the scope of this invention to employ a dimple in the flexible folded edge of a suture package whose top seams form a peaked-roof seal. Such a package has lips extending above the seal which may be torn apart and torn through the strippable seal to enable the removal of the suture therefrom.

As many widely different embodiments may be made without departing from the spirit or scope of this invention, it is understood that the invention is not limited except as defined in the appended claim.

I claim:

A suture package comprising: in combination, a sealed, liquid-tight, flexible envelope of a heat-sealed, thermoplastic, resin film, said envelope having one folded edge and heat-sealed beaded edges, a cylindrical reel longitudinally internally in said envelope, a suture wound on said cylindrical reel, said reel thereby bulging the envelope along the major portion of its length, and a stress-relieving, dihedral dimple in the folded edge only whereby the dihedral dimple forms a flat dihedral angle, the four edges of which contact the principal planes of the envelope so that the cross section of the envelope perpendicular to the axis of the reel is a flat rhomboid, and there is effectively no warping required of the film along the beaded edges, and a tubing fluid in said envelope.

References Cited in the file of this patent

UNITED STATES PATENTS

| | | |
|---|---|---|
| 2,508,962 | Moore | May 23, 1950 |
| 2,549,040 | Adams | Apr. 17, 1951 |
| 2,634,857 | Weckesser | Apr. 14, 1953 |
| 2,804,258 | Petter | Aug. 27, 1957 |